E. BRADFIELD.
Dusting Mill.
No. 612. Reissued Oct. 12. 1858.
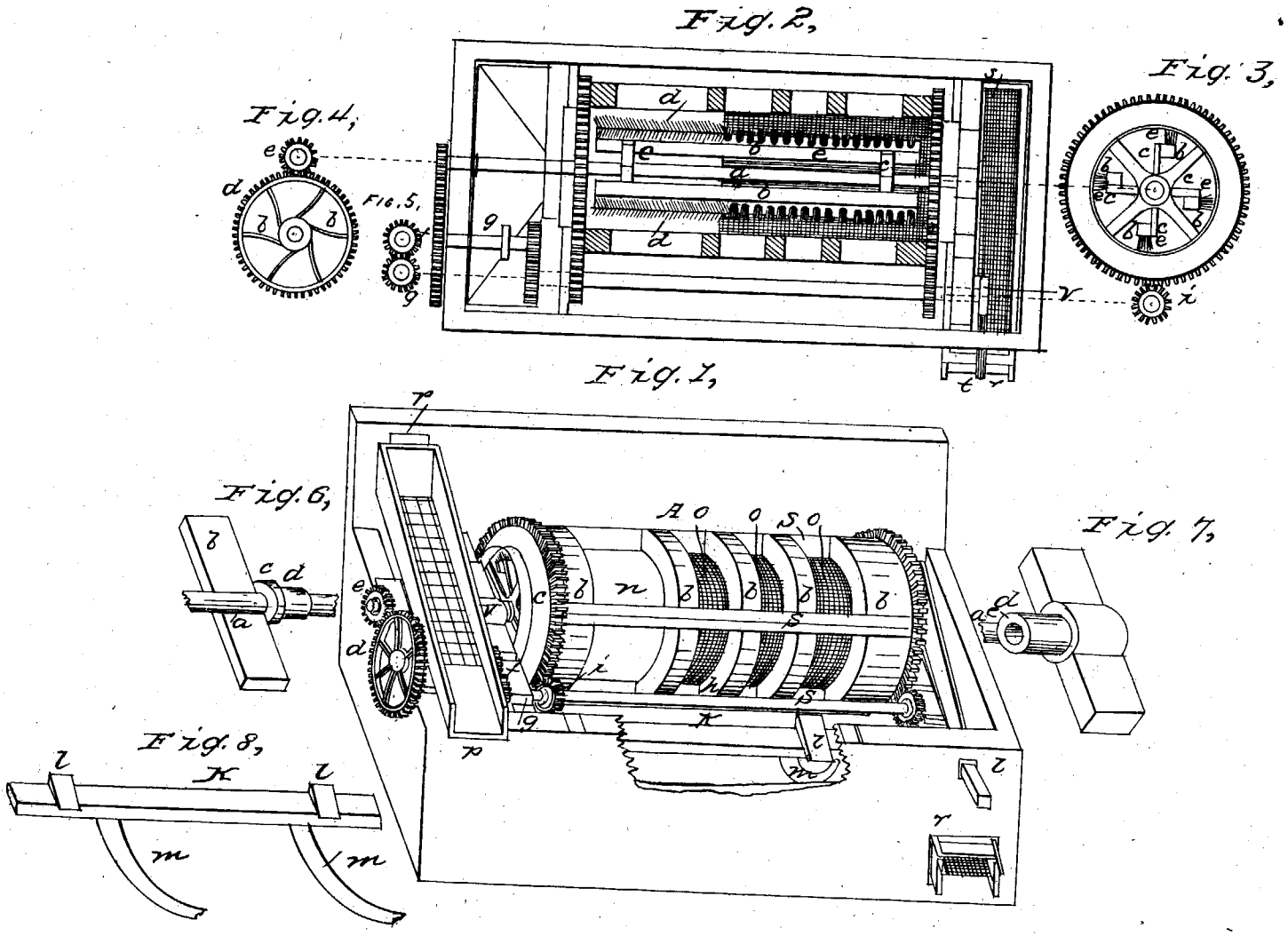
N. PETERS. Photo-Lithographer, Washington, D. C.

UNITED STATES PATENT OFFICE.

EDWARD BRADFIELD, OF ROCHESTER, NEW YORK.

IMPROVEMENT IN BOLTING FLOUR.

Specification forming part of Letters Patent No. 4,758, dated September 15, 1846; Reissue No. 612, dated October 12, 1858.

*To all whom it may concern:*

Be it known that I, EDWARD BRADFIELD, of Rochester, in the county of Monroe and State of New York, have invented a new and useful Machine for Bolting Flour and for Scouring and Dusting Mill-Feed after Bolting; and I do hereby declare that the following is a full, clear, and exact description of the same, reference being had to the annexed drawings, making a part of this specification, in which—

Figure 1 is a perspective view of my invention, with part of case removed and a portion broken away to show the operation of the beater. Fig. 2 is a horizontal section of the same, taken through the center of case and bolt, showing the interior of the machine. Fig. 3 is an end view of both cylinders, with driving-pinion for outside cylinder or bolt. Fig. 4 is a detached face view of driving-wheel and pinion by which motion is given to the inside cylinder. Fig. 5 is a detached face view of pinion by which motion is given to the outside cylinder. Fig. 6 is an enlarged perspective view of head-box and journal. Fig. 7 is an enlarged view of tail-box and journal. Fig. 8 is a detached view of beater.

The object of this invention is to prevent by a simple means the wire-cloth of the screen or bolt from becoming clogged or choked—a contingency of frequent occurrence in the original machines for bolting and dusting; also, by a novel construction and arrangement of parts, which will be hereinafter described, to render the machine far more efficient in its operation than usual, and much more durable.

To enable those skilled in the art to fully understand and construct my invention, I will proceed to describe it.

A, Fig. 1, represents the outside cylinder or bolt, which is a cylindrical frame of wood, formed of two equal longitudinal parts properly secured together and lined inside at *n* with sheet-metal and at *o* with wire-gauze secured to the annular ribs *b*. If desired, however, the whole of the frame A may be lined with the wire-gauze.

*c c* are cast-metal heads with spur gearing. These heads form the extreme ends of outside cylinder or bolt, A, and they are fastened to adjoining ribs *b b*.

*d* (shown also in Fig. 4) is the main driving-wheel, which, by means of pinion *e* gives an accelerated motion to inside cylinder-pinion *f* on same shaft as wheel *d*. *f* gives motion to pinion *g* on shaft *h*, and by means of pinions *i i* on shaft *h* a reversed or diminished motion is given to the wire-gauze cylinder or bolt A, the pinions *i i* gearing into the spur-gearing of the heads *c*. (See Figs. 1 and 3.)

P P is a spout and screener, which may be stationary, or it may have a shake-motion given it by a cam, *g*. (See Fig. 2.) If stationary, it must have sufficient inclination to throw off the refuse and discharge the feed or flour into the bolt A.

*r r*, Figs. 1 and 2, is a double separator, suspended at the end of lever *t*, by means of which and a cam, V, Fig. 2, it receives motion. The sides of separator are formed of wood, the bottom being covered with fine wire-gauze, and at a given distance above and parallel with it is another sheet of coarser wire-gauze.

S, Fig. 2, is the upper end of separator hung on the case of the machine.

*a*, Fig. 2, is the shaft of the inside cylinder; *b b*, bars of wood attached to the arm *c c*, (seen also at *c c c c*, Fig. 3, together with an end view of bars *b b b b*.)

*d d*, Fig. 2, are cards or metal points to assist in scouring the feed.

*e e* are bristle-brushes.

*a*, Fig. 6, is the shaft of inside cylinder, running in the box *b*, passing through the flange *c* and journal *d*, which journal or its equivalent, in connection with central hub, $c^2$, of ring or head *c*, (see Figs. 1 and 3,) forms the support and bearing for upper end of cylinder or bolt A.

*d*, Fig. 7, is a similar journal, which, in connection with a central hub of lower ring or head, *c*, supports and keeps in place the lower end of cylinder or bolt A. Both hubs of the rings or heads *c* are precisely alike, and they are arranged in the same way on the shaft *a* of inside cylinder.

K, Fig. 8, is a bar of wood, and *m m* are steel springs which are fastened to the bar K. The outer ends of the springs *m* are, when the bar K is in proper place, attached to the case of the machine. (See Fig. 1.) The bar K is pressed by the springs *m* against the cylinder or bolt A, and, as the latter revolves, bars S S S, which pass over wedge-shaped block *l l*, press back the bar K, which, when released from the blocks, is thrown against the cylinder or bolt and gives a tremulous or vibratory motion to the wire-gauze.

The cylinder or bolt A may be made of any desired length from two to eight feet, and of any desired diameter from one to four feet.

The machine may be operated horizontally or vertically, or at any intermediate angle, but when used in any other than a horizontal position, the upper end of the brush-bars should be covered with a circular plate extending from the shaft to their outer edge. When horizontal, the brush-bars *b* should be placed obliquely to the shaft *d*, about one-half inch to each foot of their length, for the purpose of carrying the feed forward to the tail end of the cylinder or bolt. When at an angle of thirty degrees or more, it will discharge the feed with the bars placed parallel with the shaft. At the above angle the inside cylinder or brush-shaft should have from one hundred and fifty to two hundred revolutions per minute when the bolt is from eighteen inches to two feet diameter, the speed being increased as the machine approaches a vertical position.

The feed or other substance to be bolted or dusted is conveyed to the screen P P, Fig. 1, the screen carrying off large foreign substances. The feed or other substances passes through the screen P P, and is conveyed by the spout which forms the bottom thereof into the upper end of bolt A, where it is agitated and scoured, by which process the flour adhering to the feed, after dusting in the usual way, is loosened and discharged through the wire-gauze of bolt A, the meshes of which are kept open by the tremulous or vibratory motion given it by the beater K or its equivalent. The feed or other substance is discharged at the lower end of the separator *r*, the coarse wire separating the bran and the fine wire the shorts from the middlings. The separator, however, may be dispensed with and the feed separated in the usual way.

The advantages to be derived from my improvement are, first, an increased amount of flour is obtained from a given quantity of wheat, for feed, after being dusted in the manner it was previous to my invention, on passing through this machine, yields an additional amount of flour—about five per cent.; second, the arrangement of the heads or rings, whereby the outside cylinder or bolt, A, has a central or nearly central support, thereby diminishing friction and increasing the durability of the machine; third, the preventing of the clogging or choking of the wire-gauze.

The cast-iron head *c* that is shown in Fig. 1 is provided with an annular flange, $c^{\times}$, which projects horizontally from the head and inward to prevent the escape of the feed at the upper end of the bolt.

I am aware that wire-cloth or wire-gauze screens or bolts have been previously used, and I do not claim, broadly and separately, such device, but,

Having thus described my invention, what I claim as new, and desire to secure by Letters Patent, is—

1. The cast heads or annular rings C C, Figs. 1 and 3, with the flange and hubs, substantially as described, or any mechanical equivalent therefor when used in connection with wire cylinder or circular wire bolt.

2. In combination with claim 1, the cylindrical journals *a a*, Figs. 6 and 7, or their equivalents, by means of which the bolt revolves in or on a support inside the space for admitting the feed, instead of on the outside, as in the English bolt.

3. The combination of the cards or metal points *d* and brushes *e*, attached to bars *b* of the inside cylinder, for the purpose set forth.

4. The spout P P, when arranged in relation with the cylinder or bolt A and used in connection with said cylinder or bolt A, and the inside brush-cylinder, as and for the purpose specified.

EDWARD BRADFIELD.

Witnesses:
J. Q. BUCKLEY,
M. HUGHES.